United States Patent
Boi et al.

(10) Patent No.: US 10,557,389 B2
(45) Date of Patent: Feb. 11, 2020

(54) GASKET FOR A VALVE OF AN INTERNAL COMBUSTION ENGINE

(71) Applicant: Freudenberg Sealing Technologies S.A.S. Di Externa Italia S.R.L.U., Pinerolo (TO) (IT)

(72) Inventors: Alessandro Boi, Pinerolo (IT); Wojciech Kokoszynski, Pinerolo (IT); Kira Sophie Truxius, Pinerolo (IT); Volker Schroiff, Pinerolo (IT); Martin Gramlich, Pinerolo (IT); Patrick Martini, Pinerolo (IT); Christoph Klingshirn, Pinerolo (IT)

(73) Assignee: FREUDENBERG SEALING TECHNOLOGIES S.A.S. DI EXTERNA ITALIA S.R.L.U. (IT)

( * ) Notice: Subject to any disclaimer, the term of this patent is extended or adjusted under 35 U.S.C. 154(b) by 0 days.

(21) Appl. No.: 16/232,413

(22) Filed: Dec. 26, 2018

(65) Prior Publication Data
US 2019/0309661 A1    Oct. 10, 2019

(30) Foreign Application Priority Data

Apr. 4, 2018  (IT) .......................... 102018000004202

(51) Int. Cl.
| | |
|---|---|
| *F01L 3/08* | (2006.01) |
| *F16K 41/04* | (2006.01) |
| *F01L 3/02* | (2006.01) |

(52) U.S. Cl.
CPC .................. *F01L 3/08* (2013.01); *F01L 3/02* (2013.01); *F16K 41/04* (2013.01); *F01L 2810/02* (2013.01)

(58) Field of Classification Search
CPC . F01L 3/08; F01L 3/02; F01L 2810/02; F16K 41/04
See application file for complete search history.

(56) References Cited

U.S. PATENT DOCUMENTS

| | | | | |
|---|---|---|---|---|
| 2,761,438 A | * | 9/1956 | Niess ........................ | F01L 3/08 123/188.6 |
| 3,699,942 A | * | 10/1972 | Moray ...................... | F01L 3/08 123/188.6 |

(Continued)

FOREIGN PATENT DOCUMENTS

EP    3236117 A1    10/2017

OTHER PUBLICATIONS

Italian Search Report for related application No. 201800004202 issued Dec. 7, 2018.

*Primary Examiner* — Hung Q Nguyen
(74) *Attorney, Agent, or Firm* — The Belles Group, P.C.

(57) ABSTRACT

It is described a gasket for a valve of an internal combustion engine, having an axis and comprising an annular sealing element to be externally arranged on the valve and an annular support element, coaxially arranged on the sealing element to press it radially on the valve; the support element comprising a first annular component, internally cooperating with the sealing element, a second annular component, coaxially surrounding the first component, and snap coupling means between these components; the second component comprising an annular main body and an outer annular end flange; the main body further having an annular edge projecting towards the axis and defining an axial abutment for the first component; the snap coupling means comprising two or more hooking projections angularly equidistant about the axis, cantileverly extending from the annular edge towards the flange and cooperating in contact with the first component to abuttingly keep it against the annular edge.

10 Claims, 4 Drawing Sheets

(56) References Cited

U.S. PATENT DOCUMENTS

| | | | | |
|---|---|---|---|---|
| 4,325,558 | A * | 4/1982 | Poggio | F16J 15/3268 |
| | | | | 123/188.6 |
| 7,328,679 | B2 * | 2/2008 | Ihara | F01L 1/18 |
| | | | | 123/188.6 |
| 2007/0022997 | A1 * | 2/2007 | Lantelme | F01L 3/08 |
| | | | | 123/188.6 |
| 2008/0157480 | A1 * | 7/2008 | Scarano | F01L 3/08 |
| | | | | 277/402 |
| 2013/0015625 | A1 * | 1/2013 | Hegemier | F01L 3/08 |
| | | | | 277/502 |
| 2015/0123352 | A1 * | 5/2015 | Zoppi | F01L 3/08 |
| | | | | 277/591 |
| 2015/0167850 | A1 * | 6/2015 | Zoppi | F16K 1/46 |
| | | | | 251/214 |

* cited by examiner

GASKET FOR A VALVE OF AN INTERNAL COMBUSTION ENGINE

CROSS-REFERENCE TO RELATED PATENT APPLICATIONS

The present application claims priority to Italian Patent Application No. 102018000004202, filed Apr. 4, 2018. The disclosure of the aforementioned priority application is incorporated herein by reference in its entirety.

TECHNICAL FIELD

The present invention relates to a gasket for a valve of an internal combustion engine.

BACKGROUND OF THE INVENTION

Known internal combustion engines for vehicles comprise a head bearing one or more cylinders, inside which the engine cycle is carried out, and which communicate with respective combustion chambers of the engine. On the aforesaid head there are also provided suitable seats for connecting the combustion chamber with ducts suitable for supplying said chamber with a mixture of unburnt fuel and air ("intake ducts") and for removing the combusted gases from said combustion chamber ("exhaust ducts").

The flows from and towards each combustion chamber are controlled by suitable valves acting on the aforementioned seats. In particular, each valve essentially comprises a guide element, fixed inside a cavity of the head of the engine and defining a through seat, and a stem, slidingly movable in opposite directions within the aforesaid seat and carrying at one end a shuttering element to close the connection between the relative intake or exhaust duct and the corresponding combustion chamber.

The opposite end of the valve stem axially projects from the respective guide element and receives actuating forces from a relative control device, for example a cam shaft.

The valve stem is axially loaded by a helical spring in the closing direction of the connection between the respective intake or exhaust duct and the corresponding combustion chamber.

In particular, the spring is coaxially mounted about the valve and is axially interposed between a stationary surface formed on the head of the engine and a plate fastened to the valve stem, near or at the end of the stem cooperating with the control device.

The valves of the aforesaid type normally have sealing gaskets for the lubricating oil normally circulating in the engines. Said gaskets, in one of the most commonly known forms, comprise a support or reinforcement member, having a substantially tubular shape and made of a single piece of metal material, and an annular sealing element, made of elastomeric material and interposed between the support element and the valve.

In particular, the sealing element typically comprises a first portion cooperating through its own radially inner annular surface with the radially outer annular surface of the portion of the guide element oriented in use towards the aforementioned control device, and a second portion cooperating directly with the valve stem.

The gaskets of the aforesaid type are widely used on all internal combustion engines to control the amount of lubricating oil flowing from the distribution area to the combustion chambers. An excessive flow of lubricating oil causes, besides an obviously high consumption of the oil, a deterioration of the efficiency of the engine and a reduction in the performance of the catalyst of the vehicle. On the other hand, an insufficient flow causes increased wear and noise of the valves together with local temperature peaks. These phenomena can cause a premature damage to the valves due to the seizure of the valve stem inside the guide element.

Thanks to the first portion of the sealing element acting on the guide element of the relative valve, the known sealing gaskets allow a static type seal, and thanks to the second portion of the sealing element cooperating with the stem, a dynamic type seal. In particular, the static seal must ensure a certain degree of radial compression on the guide element in order to avoid the leakage of lubricating oil towards the combustion chambers and at the same time keep the gasket in position, while the dynamic seal is designed for allowing the minimum flow of oil necessary for the lubrication of the coupling between the stem and the guide element.

The support element includes:
a substantially cylindrical main portion;
a first annular flange extending radially inwardly from an axial end of the main portion and partly embedded in an annular seat of the sealing element; and
a second annular flange extending radially outwardly from an opposite axial end of the main portion and suitable to be pushed against the aforementioned stationary surface of the head of the motor by the spring acting on the valve stem.

In practice, the second annular flange of the support element defines an abutment surface for an axial end of the spring and receives from this latter the normal operating loads.

The second annular flange also allows the gasket to be actuated in the desired position on the valve.

In order to reduce the weight and costs of the gaskets described above, the patent application EP-B-2868875 proposes the implementation of the support element in two separate snap coupled components. The component directly cooperating with the sealing element and therefore radially innermost was made of metal material, while the component cooperating with the valve spring and therefore radially outermost was made of plastic material.

In practice, the radially innermost component defines an interaction portion of the support element with the sealing member, while the radially outermost component defines a positioning portion of the support element on the head of the engine and with respect to the valve guide element.

In more detail, the radially outermost component essentially comprises a cylindrical main body, adapted to define a receiving seat for an axial end portion of the radially innermost component, and a flat annular end flange, radially projecting outwardly from the main body and adapted to abuttingly cooperate against the aforementioned stationary surface of the head of the engine under the axial thrust of the valve spring.

The radially outermost component further comprises three hooking projections projecting from an end edge of the main body opposite the annular flange cooperating with the head of the engine; the aforesaid hooking projections extend, in an undeformed position, in a direction parallel to the axis of the gasket, and are angularly equidistant about the aforesaid axis and elastically flexible from and towards the radially innermost component for hooking or releasing it.

In particular, each hooking projection carries at its free end a tooth adapted to snap couple with an axial end portion of the radially innermost component opposite the one housed in the seat of the main body of the radially outermost component.

The solution described, although functionally valid, is susceptible of further improvements. In fact, it has been noted that, in the case of high pressures in the engine, the radially innermost component, and the sealing element with it, could be pushed towards the end teeth of the hooking projections with a high force capable of spreading open the hooking projections and consequently of removing the gasket from the respective valve.

SUMMARY OF THE INVENTION

The object of the present invention is therefore to provide a gasket for a valve of an internal combustion engine, which simply and inexpensively allows overcoming the aforementioned drawback without giving up the use of a support element formed by two distinct components.

The aforesaid object is achieved by the present invention, in that it relates to a gasket for a valve of an internal combustion engine, according to what is defined in claim 1.

BRIEF DESCRIPTION OF THE DRAWINGS

For a better understanding of the present invention, a preferred embodiment is described below purely by way of non-limiting example and with reference to the attached drawings, in which.

DETAILED DESCRIPTION OF THE INVENTION

Figure 1:
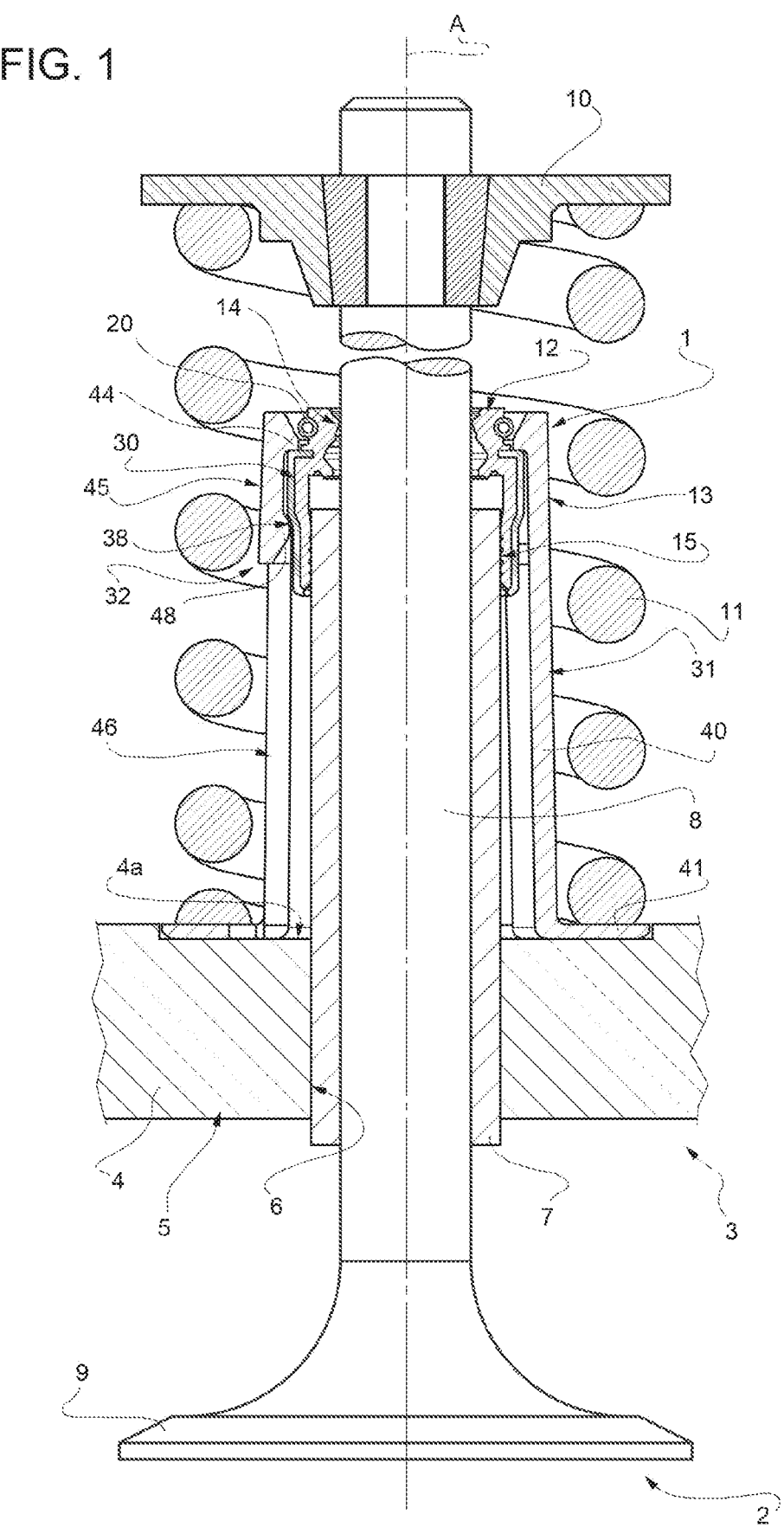
FIG. 1 shows an axial sectional view of a gasket made according to the present invention and mounted on a valve of an internal combustion engine.
Figure 2:
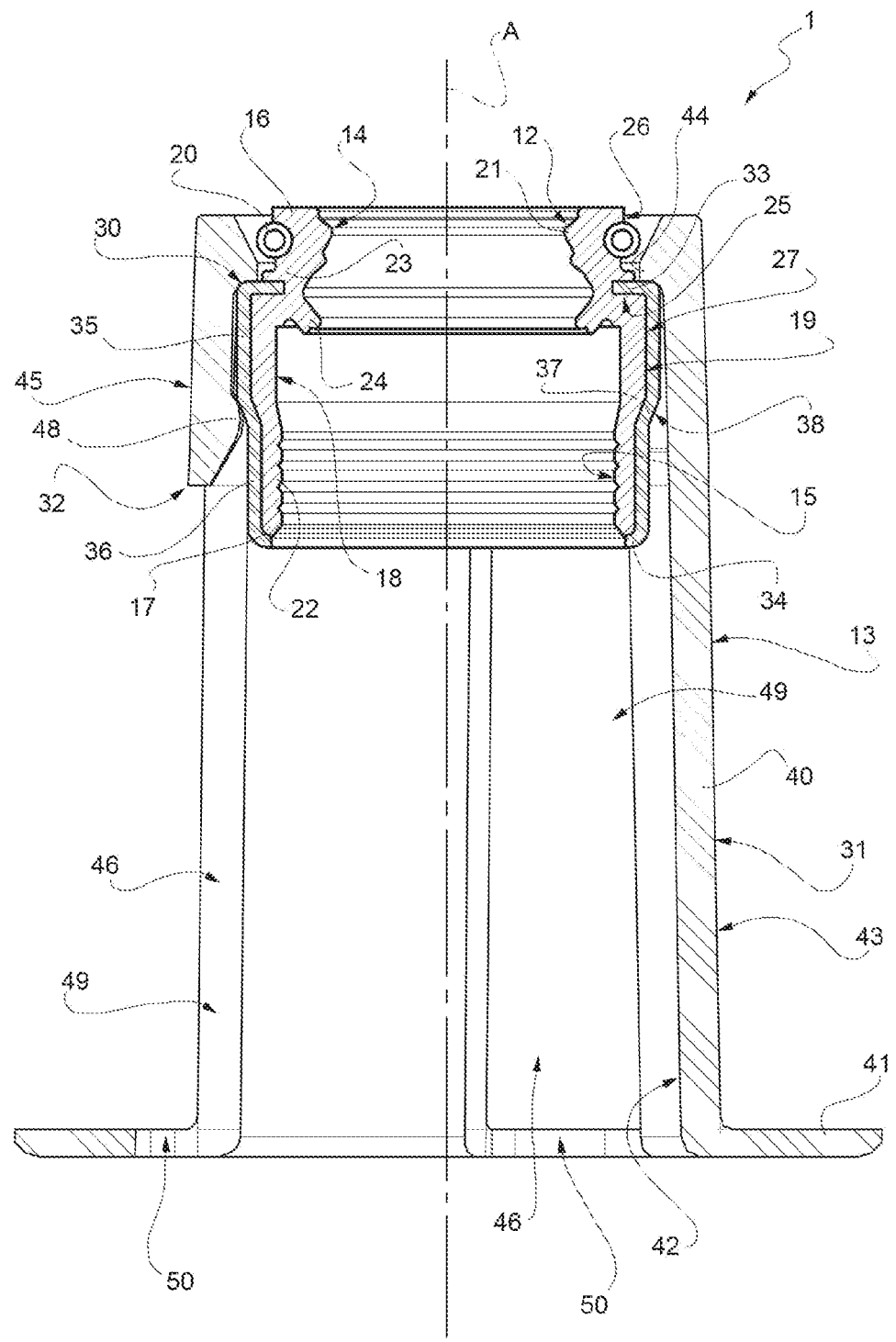
FIG. 2 shows, in an axial section and on an enlarged scale, the gasket of FIG. 1.

With reference to FIGS. 1 and 2, 1 indicates as a whole a gasket according to the present invention for a valve 2 of an internal combustion engine 3, known per se and illustrated in FIG. 1 only to the extent necessary to the understanding of the present invention.

In more detail, FIG. 1 shows the engine 3 only with regard to a portion 4 of a head 5, which defines in a known manner a combustion chamber (not visible in FIG. 1 but arranged below the portion 4 of the head 5), in which a fuel is oxidized in the presence of combustion air in order to transform the chemical energy contained in the fuel into pressure energy.

The combustion chamber receives in a known way, through an opening thereof, a mixture comprising the fuel and the combustion air and discharges, through another opening, the gas and the combustion air at the end of the combustion process.

The flows from and towards the combustion chamber are controlled by respective valves 2 of the aforementioned type, acting on the aforesaid openings of the combustion chamber.

The following description will refer for simplicity's sake to a single valve 2, it being clear that the same characteristics described are present in every valve of this type used in the engine 3.

With reference to FIG. 1, the valve 2 is housed in a through seat 6 having an axis A, which is formed in the portion 4 of the head 5 and normally contains lubricating oil.

The valve 2 comprises a tubular guide element 7 fitted by interference within the seat 6, and a stem 8 slidingly movable in opposite directions along the axis A within the guide element 7.

In more detail, the stem 8 sliding axially sliding from opposite sides of the guide element 7 and is respectively provided at its opposite axial ends with a shuttering element 9, engaging in fluid-tight manner the relative opening in the chamber of combustion, and with an actuating element or plate 10 receiving actuating forces from a control mechanism, in itself known and not shown, for example a cam shaft.

A gasket 1 according to the invention, coaxially surrounding both the guide element 7 and the stem 8, is externally fitted on the axial end portion of the guide element 7, from which the end of the stem 8 provided with the plate 10 projects.

The valve 2 further comprises a spring 11, in the illustrated example of a helical type, which cooperates at its own opposite axial ends with the plate 10 and with a part of the gasket 1 (described in greater detail in the following), which is axially pressed against an annular stationary surface 4a of the portion 4 of the head 5 having an axis A.

The spring 11 generates an elastic return force on the rod 8 to keep it always in contact with the control mechanism at the plate 10.

With reference to FIGS. 1 and 2, the gasket 1 has an annular conformation with respect to an axis coinciding with the axis A in assembly conditions.

More specifically, the gasket 1 essentially comprises a sealing element 12 having an annular shape and made of elastomeric material and a support element 13 coaxially arranged on the sealing element 12 for pressing this latter in a radial direction with respect to the axis A on the guide element 7 and on the stem 8 of the valve 2. In practice, the sealing element 12 is coaxially interposed between the support element 13 and the valve 2.

First, proceeding along the axis A towards the shuttering element 9 of the stem 8, the sealing element 12 defines a dynamic type seal 14 allowing the passage of a minimum oil flow necessary for the lubrication of the coupling between the stem 8 and the guide element 7, and then a static type seal 15 to prevent the oil flow towards the combustion chamber.

In more detail (FIG. 2), the sealing element 12 is delimited by two opposite annular disc-shaped sections 16, 17 having an axial end, by an inner circumferential surface 18, partially cooperating with the stem 8 and partially cooperating with the guide element 7 to make the seals 14 and 15, and by an outer circumferential surface 19 mating with the support element 13 and with an elastic annular collar 20 so as to press the inner circumferential surface 18 on the stem 8.

The section 16, under assembly conditions, is oriented towards the plate 10 and is crossed by the rod 8; the section 17, under assembly conditions, is oriented towards the combustion chamber and is in contact with the guide element 7 in which the stem 8 slides.

The inner circumferential surface 18 of the sealing element 12 comprises, in a position adjacent to the section 16, a section 21 having a minimum diameter, to be pressed radially by the elastic collar 20 against the stem 8 to define a dynamic type circumferential sealing line (seal 14), which allows a minimum escape of the oil flow thanks to the sliding coupling with the stem 8.

The inner circumferential surface 18 of the sealing element 12 further comprises, in a position adjacent to the section 17, a substantially cylindrical portion 22 with small undulations to be radially pressed by the support element 13 against the guide element 7 to define a static type cylindrical sealing area (seal 15).

The inner circumferential surface 18 of the sealing element 12 further comprises, in an interposed position between the section 21 and the portion 22, a further portion 23 cantileverly carrying a gas sealing lip 24 cooperating with the stem 8 of the valve 2.

The lip 24 has a substantially frustoconical shape having an axis A with a section decreasing in the opposite direction with respect to the pressure forces generated in use by the gases directed towards the section 21. In the shown case, the lip 24 has a decreasing cross-section towards the portion 22.

As shown in FIGS. 1 and 2, the lip 24 is connected to the portion 23 of the inner circumferential surface 18 of the sealing element 12 at its portion with a larger section. This connection defines a kind of virtual hinge between the lip 24 and the inner circumferential surface 18 of the sealing element 12.

The outer circumferential surface 19 of the sealing element 12 defines, in an axially interposed position between the section 21 and the portion 23 of the inner circumferential surface 18, a recess 25, whose function will be explained below. The recess 25 divides the outer circumferential surface 19 into a portion 26 for housing the elastic collar 20, extending towards the section 16, and into an elongated portion 27 extending towards the section 17 and suitable to be coupled with the support element 13 together with the recess 25.

With reference to FIGS. 1 to 4, the support element 13 is formed by two distinct annular components 30, 31, coaxially mounted by means of snap coupling means 32.

In particular, the radially innermost component 30 cooperates in use with the sealing element 12 to press it radially on the guide element 7 of the valve 2, while the component 31 is mounted in a radially outermost position on the component 30 and is positioned in use on the stationary surface 4a of the portion 4 of the head 5 of the engine 3 by means of the spring 11 of the valve 2.

In practice, the component 30 defines an interaction portion of the support element 13 with the sealing element 12, while the component 31 defines a positioning portion of the support element 13 on the portion 4 of the head 5 of the engine 3 and with respect to the guide element 7 of the valve 2. The component 31 receives operating loads from the spring 11 of the valve 2 and brings the gasket 1 into the desired position on the valve 2.

With particular reference to FIG. 2, the component 30 is preferably made of metal material and consists of an approximately cylindrical bushing elongated along the axis A. In particular, the component 30 cooperates with the portion 27 of the outer circumferential surface 19 of the sealing element 12 and essentially comprises:

- a first annular disc-shaped end portion 33, extending in a radial direction with respect to the axis A, partially embedded in use in the recess 25 of the sealing element 12 and from which the portion 24 of the outer circumferential surface 19 of the element of seal 12 projects;
- a second opposite end portion 34, slightly bent towards the axis A so as to axially retain the sealing element 12 at the section 17 of this latter;
- a first cylindrical portion 35, cantileverly extending from an outer radial end of the end portion 33 towards the end portion 34; and
- a second cylindrical portion 36 extending from the end portion 34, whose outer and inner diameters are smaller than the outer and inner diameters of the cylindrical portion 35 and connected to this latter by a tapered connecting section 37.

In practice, the component 30 has increasing radial dimensions with respect to the axis A, proceeding from its end portion 34 and then radially bending inside the recess 25 of the sealing element 12 at the opposite end portion 33.

The tapered connecting section 37 defines, on the opposite side with respect to the side cooperating with the sealing element 12, an annular shoulder 38, whose function will be explained below.

Figure 3:
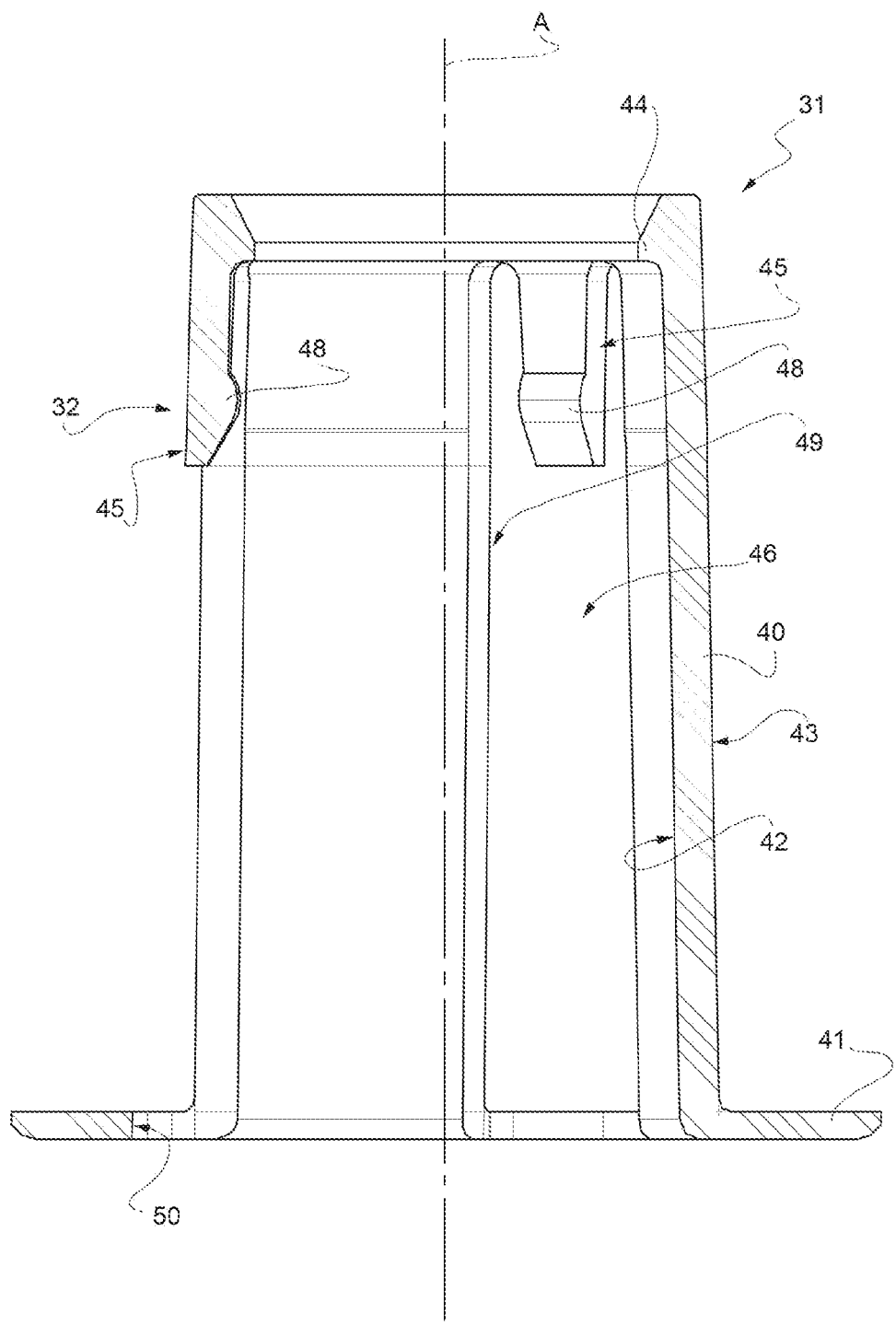
FIG. 3 shows an axial sectional view of a component of the gasket of FIG. 2.
Figure 4:
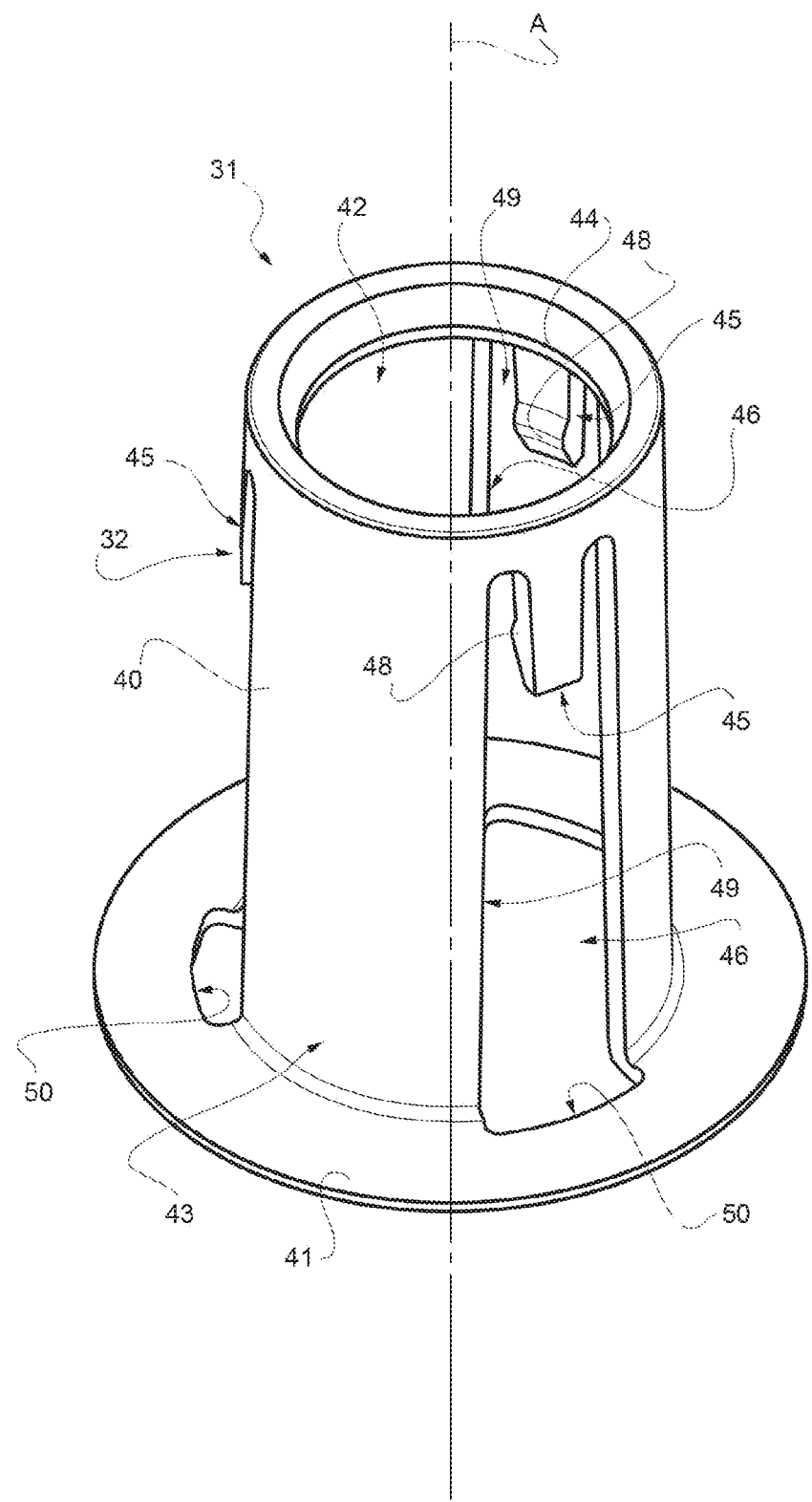
FIG. 4 shows a perspective view of the component of FIG. 3.

With reference to FIGS. 2, 3 and 4, the component 31 is made of plastic material. Preferably, the component 31 can be made of a high performance thermoplastic material with excellent mechanical and thermal resistance properties, capable of replacing the functions of metal materials in static and dynamic applications; the thermoplastic material constituting the component 31 may or may not be reinforced with suitable agents, for example of an organic or inorganic type.

The component 31 integrally comprises an annular main body 40, in the shown case slightly frustoconical, having an axis A, surrounding the component 30, and a flat annular end flange 41, radially projecting outwardly from the main body 40 and abuttingly cooperating against the stationary surface 4a of the portion 4 of the head 5 of the engine 3 under the axial thrust of the spring 11 of the valve 2.

According to a possible alternative not shown, the main body 40 could also have a cylindrical shape having an axis A.

In particular, the main body 40 is delimited by a radially inner surface 42, oriented towards the axis A, and by a radially outer surface 43, opposite the surface 42 and from which the flange 41 radially projects outwardly.

According to an important aspect of the present invention, the main body 40 has, in a position axially spaced by the flange 41, an annular edge 44 projecting radially towards the axis A and defining an axial abutment for the end portion 33 of the component 30.

According to another important aspect of the present invention, the snap coupling means 32 comprise two or more hooking projections 45, three in the illustrated example, angularly equidistant about the axis A, cantileverly extending from the annular edge 44 towards the flange 41 inside respective windows 46 through the main body 40 and cooperating in contact with the component 30 to abuttingly keep it against the annular edge 44.

In the example shown in the accompanying figures, the annular edge 44 defines an end portion of the main body 40 axially opposite the flange 41.

The hooking projections 45 are integral with the main body 40 and have, at their free ends, respective retaining teeth projecting towards the axis A and configured to abuttingly cooperate against the outer annular shoulder 38 of the component 30.

The hooking projections 45 extend, in an undeformed position, substantially parallel to the axis A (FIGS. 2 to 4) and are elastically flexible from and towards the component 30 to snap couple with the annular shoulder 38 of this latter.

Each window 46 is delimited on one side by the annular edge and on the opposite side by the flange 41. More precisely, each window 46 has a first portion 49 extending along the main body 40 substantially for the whole axial height thereof, and a second portion 50, of reduced size, extending along part of the radial depth of the flange 41.

By considering the characteristics of the gasket 1 made according to the dictates of the present invention, the advantages it allows obtaining are evident.

In particular, thanks to the interaction of axially opposite parts of the annular edge 44 and of the hooking projections 45 of the component 31 with the component 30, it allows avoiding even a partial removal of the gasket 1 from the valve 2 if, in use, the engine 3 is subjected to high pressures.

Finally, it is clear that modifications and variations can be made to the gasket 1 here described and illustrated, which do not come out of the scope of protection defined by the claims.

In particular, also the component 30 could be made of plastic material.

The invention claimed is:

1. A gasket for a valve of an internal combustion engine; said valve comprising a guide element defining a through seat, and a mobile stem sliding in said seat; said gasket having a central axis and comprising:
   - an elastically deformable sealing element, having an annular shape with respect to said axis (A) and adapted to be arranged externally on said valve to cooperate both with said guide element and with said stem; and
   - a support element having an annular shape with respect to said axis (A), coaxially arranged on at least part of said sealing element so that said sealing element is radially pressed between said support element and said valve;
   wherein said support element comprises:
   - a first annular component, internally cooperating with at least one portion of said sealing element;
   - a second annular component, distinct from said first component, mounted coaxially and in a radially outermost position on said first component and configured to arrange said gasket to be used on said engine; and
   - snap coupling means between said first and second components;
   wherein said second component comprises a substantially cylindrical or frustoconical main body surrounding said first component, and an annular flange radially projecting outwards from one end of said main body and adapted to be mounted in a fixed position with respect to said valve;
   wherein said main body of said second component has, in a position axially spaced from said flange, an annular edge radially projecting towards said axis (A) and defining an axial abutment for an interaction portion of said first component; and wherein said snap coupling means comprises two or more hooking projections angularly equidistant about said axis (A), cantileverly extending from said annular edge towards said flange within respective windows of said main body and cooperating in contact with said first component to abuttingly keep it against said annular edge.

2. The gasket according to claim 1, wherein said annular edge defines an end portion of said main body opposite said flange.

3. The gasket according to claim 1, wherein said hooking projections have respective retaining teeth projecting towards said axis (A) and configured to abuttingly cooperate against an outer annular shoulder of said first component axially spaced from said interaction portion.

4. The gasket according to claim 3, wherein said hooking projections extend, in a non-deformed position, substantially parallel to said axis (A) and are elastically flexible from and towards said first component to snap couple with said annular shoulder of said first component.

5. The gasket according to claim 3, wherein said retaining teeth are formed on the free ends of said hooking projections.

6. The gasket according to claim 1, wherein said first component comprises, axially proceeding from said interaction portion towards said flange of said second component, a first cylindrical portion and a second cylindrical portion, having an outer diameter smaller than the outer diameter of said first cylindrical portion and joined to the first cylindrical portion by means of a tapered connecting section defining said annular shoulder.

7. The gasket according to claim 1, wherein said interaction portion defines an axial end of said first component.

8. The gasket according to claim 1, wherein each said window is delimited on one side by said annular edge and on the opposite side by said flange.

9. The gasket according to claim 1, wherein said first component is made of metal material.

10. The gasket according to claim 1, wherein said second component is made of plastic material.

* * * * *